(12) United States Patent
Kowalski

(10) Patent No.: US 6,728,355 B2
(45) Date of Patent: *Apr. 27, 2004

(54) METHOD AND APPARATUS FOR FORWARDING A CALLER IDENTIFICATION FOR A CREDIT CARD OR CALLING CARD CALL TO AN AUTOMATIC NUMBER IDENTIFICATION SYSTEM OF A TELEPHONE NETWORK

(75) Inventor: Thaddeus Julius Kowalski, Summit, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/928,313

(22) Filed: Aug. 14, 2001

(65) Prior Publication Data

US 2002/0027980 A1 Mar. 7, 2002

Related U.S. Application Data

(63) Continuation of application No. 09/431,066, filed on Nov. 1, 1999, now Pat. No. 6,310,943, which is a continuation of application No. 08/846,077, filed on Apr. 25, 1997, now Pat. No. 5,982,866.

(51) Int. Cl.[7] ................................................. H04M 1/56
(52) U.S. Cl. ............................ 379/142.06; 379/142.17; 379/127.01

(58) Field of Search ..................... 379/142.06, 127.01, 379/88.2, 265, 127.03, 142.17, 88.19, 93.17, 93.23, 144.01

(56) References Cited

U.S. PATENT DOCUMENTS

| 5,046,088 | A |   | 9/1991  | Margulies        |
| 5,278,894 | A | * | 1/1994  | Shaw             |
| 5,283,824 | A |   | 2/1994  | Shaw             |
| 5,521,966 | A | * | 5/1996  | Friedes et al.   |
| 5,526,406 | A | * | 6/1996  | Luneau           |
| 5,590,184 | A |   | 12/1996 | London           |
| 5,784,444 | A |   | 7/1998  | Snyder et al.    |
| 5,832,072 | A | * | 11/1998 | Rozenblit        |
| 5,864,612 | A | * | 1/1999  | Strauss          |
| 5,901,209 | A |   | 5/1999  | Tannenbaum et al.|
| 5,903,636 | A |   | 5/1999  | Malik            |
| 5,982,866 | A | * | 11/1999 | Kowalski         |
| 6,137,870 | A | * | 10/2000 | Scherer          |

* cited by examiner

Primary Examiner—Curtis Kuntz
Assistant Examiner—Barry W Taylor

(57) ABSTRACT

A telecommunication system enables a called party having a caller identification device to learn the identity of a calling party although the calling party is a credit card caller, a calling card caller, a caller using an Intelligent/Agent service, a caller using a pager or a caller connected to a PBX system. If the calling party's ANI does not fully identify the calling party, information stored in a database is used to supplement the ANI so that the calling party can be identified.

10 Claims, 2 Drawing Sheets

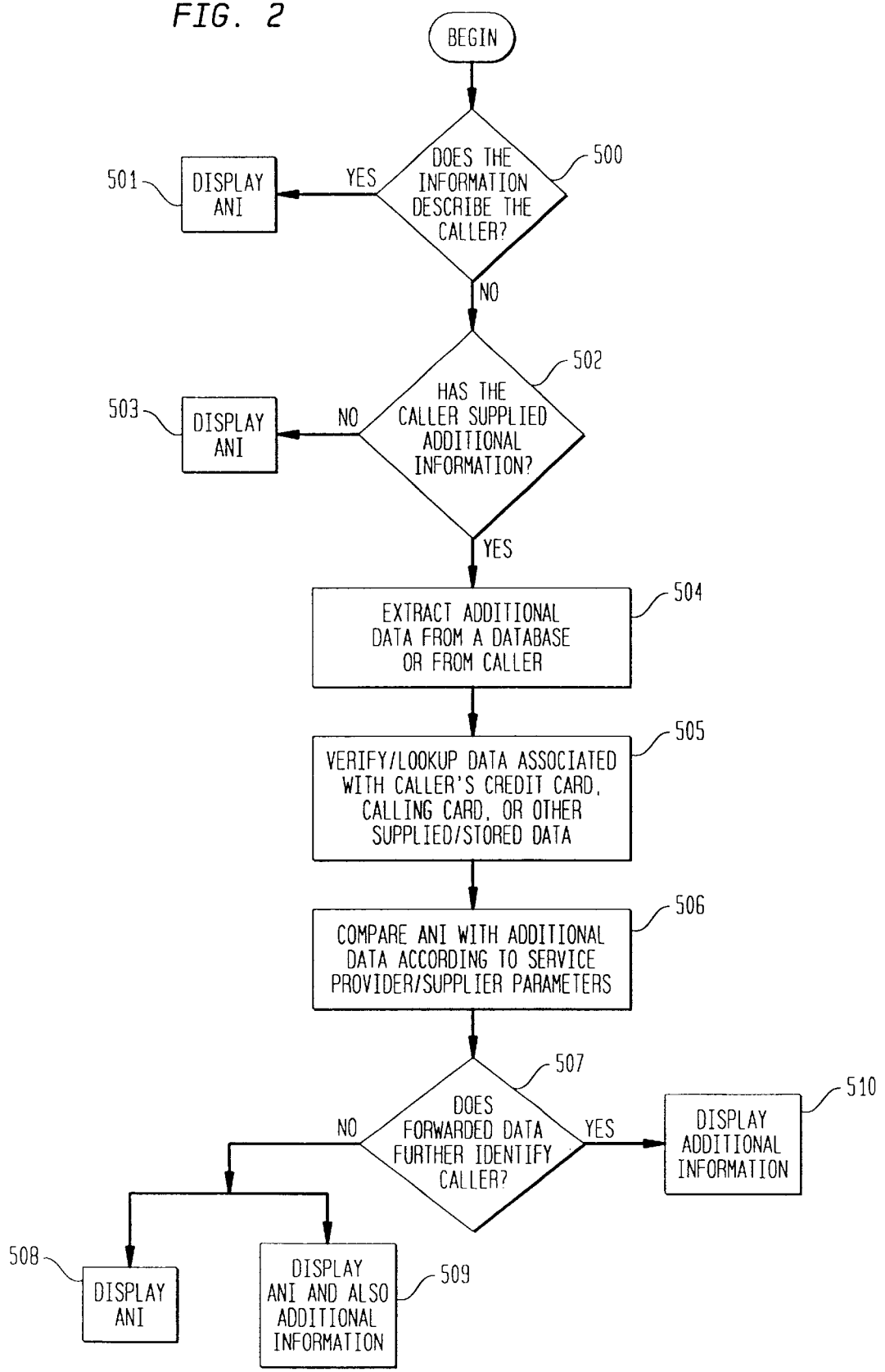

METHOD AND APPARATUS FOR FORWARDING A CALLER IDENTIFICATION FOR A CREDIT CARD OR CALLING CARD CALL TO AN AUTOMATIC NUMBER IDENTIFICATION SYSTEM OF A TELEPHONE NETWORK

This application is a continuation of application Ser. No. 09/431,066, filed Nov. 1, 1999 (allowed) now U.S. Pat. No. 6,310,943, which is a continuation of application Ser. No. 08/846,077, filed Apr. 25, 1997 (issued as U.S. Pat. No. 5,982,866).

TECHNICAL FIELD

This invention generally relates to the field of telecommunications and, more particularly, to a method and apparatus for forwarding caller identification information to a called party.

BACKGROUND OF THE INVENTION

Caller identification (ID) service and automatic number identification (ANI) are terms used interchangeably to refer to a telephone service capability which identifies the calling number to a called party. Caller ID service is currently offered on an intrastate basis and allows subscribers of the service, when they receive local telephone calls, to describe the telephone number of the calling party from the local exchange carrier (LEC). On the other hand, ANI is the billing telephone number of the calling party. ANI can be used intrastate as well as interstate.

During a call set up for a credit card, calling card, or other form of telephone call where the caller is not at a location from which the ANI can be forwarded, a network service center, disposed either in a LEC or an inter-exchange carrier (IXC) network, processes the call by looking up the caller's account information to determine an account to which the call should be billed. Other examples of forms of telephone calls where the caller is not at a location where an ANI cannot be forwarded may include, but are not limited to, a caller connected to a private branch exchange (PBX), a caller calling from a cellular phone or a caller using an Intelligent/Agent. An Intelligent/Agent is a telephone service which integrates multiple services and utilizes voice processing technology for inbound and outbound calling, voice messaging, call screening, paging and conferencing.

Typically, once the caller's information and account billing code are verified, the network service center establishes call routing and forwards the ANI for the call as derived from an originating central office toll switch. The central office switch most commonly used in the United States toll communication network is the # 4 Electronic Switching System (#4ESS) offered by Lucent Technologies, Inc. The #4ESS takes the ANI (typically the caller's telephone number, but it may be the billing number) and the called party's telephone number and sends the information to a network control point (NCP) that processes data and forwards the processed data to the called party. Alternatively, when the caller is calling, for example, from a pay phone, the caller's credit card number replaces the calling telephone number as the ANI. The ANI forwarded for credit card and billing card calls is displayed to the called party simply as "out of area," which fails to identify the true caller to the called party having a caller ID or ANI device. Accordingly, there exists a need for a caller ID or ANI that identifies a caller using a credit card, a caller using a calling card, a caller using an Intelligent/Agent service or any other system wherein the ANI associated with these calls is undisclosed.

U.S. Pat. No. 5,311,572 to Friedes et al., incorporated herein by reference in its entirety, describes how a customized billing record may be created for a subscriber in a toll network and whether a calling party's origination information (such as an ANI used in forwarding a billing number) is insufficient to affirmatively identify the caller. The information is obtained by a prompting device which solicits any additional information to delineate a more precise profile of the caller during the call setup and, if predetermined criteria of the toll network service provider are met, the service provider to the toll network allows the call to proceed. However, the method described by Friedes et al. only solicits information from the calling party to further route the incoming call and the solicited information is not displayed to the called party. Moreover, the caller has to supply additional information in real time in order for the call to proceed.

U.S. Pat. No. 5,341,414 to Popke, incorporated herein by reference in its entirety, describes a system which uses ANI equipment and techniques and/or Caller ID equipment and techniques to provide a means for telecommunications to verify if identifying information such as a caller telephone number of the location where a caller is calling from is being passed to receiving parties. However, the system of Popke fails to disclose identifying the calling party when the ANI associated with the calling party is undisclosed.

Accordingly, the prior art systems do not display information adequately identifying a calling party when the ANI associated with the calling party is undisclosed. Consequently there exists a need for a caller ID device which displays the identity of the calling party when the ANI associated with the calling party is undisclosed or does not adequately disclose the caller's identity.

SUMMARY OF THE INVENTION

The limitations cited above and others are substantially overcome through the method and apparatus disclosed herein. A method of the present invention determines whether ANI data received from a switch can identify a calling party. If the ANI data fails to disclose the identity of the calling party, additional ANI data stored in a database to further identify the calling party is retrieved. The additional ANI data is forwarded and displayed to the called party.

The above features and advantages of the present invention will be better understood from the following detailed description taken into conjunction with the accompanying drawings.

BRIEF DESCRIPTION OF THE DRAWINGS

FIG. 2 represents a flow chart of the telecommunication system of FIG. 1.

DETAILED DESCRIPTION OF THE DRAWINGS

Figure 1:
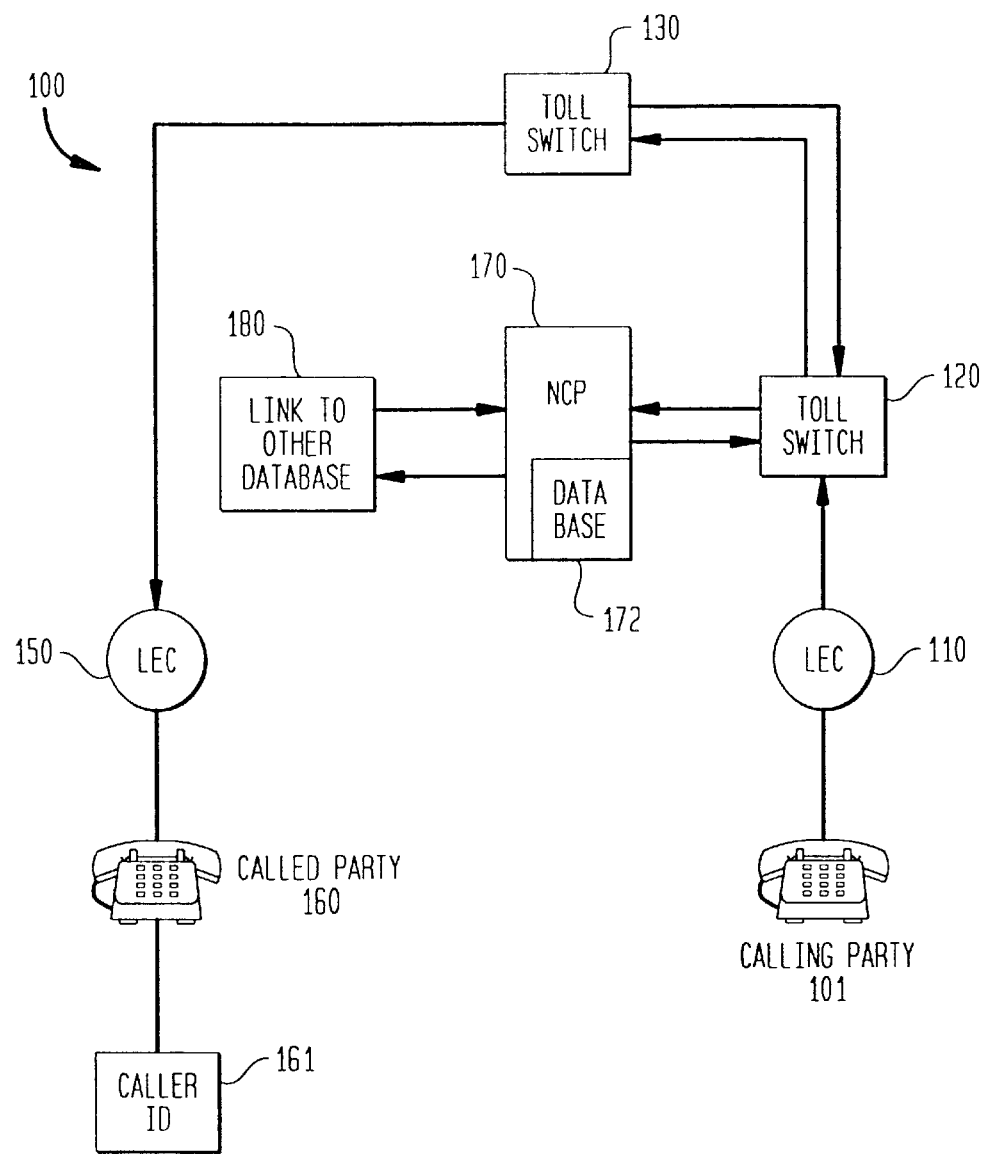
FIG. 1 represents a block diagram of a telecommunication system forwarding an ANI identifying a calling party.

Referring to FIG. 1, there is shown a telecommunication network environment 100 in accordance with the teachings of the present invention. The telecommunication network environment 100 includes a calling party 101, an originating toll switch 120, a terminating toll switch 130, a network control point (NCP) 170 and a called party 160. Typically the calling party 101 may be an individual or represent an entity and may use a personal, business, mobile, pay or other telecommunications apparatus to establish a call. The telecommunications apparatus may include, for example, telephones, mobile phones, personal computers, PBX, beeper and other customer premises or off premises equipment. Calling party 101 may use a 900 long distance pay-for-call number or an 800 toll-free long distance number to place a call into the telecommunication network. Typically, the calling party 101 is coupled to the telecommunication network via a local exchange carrier (LEC) 110.

In another embodiment (not shown), the LEC 110 may be bypassed. For example, the calling party 101 may be directly connected to the originating toll switch 120 as in the case of mobile communication devices such as a cellular telephone or a two-way pager. In yet another embodiment (also not shown), the calling party 101 may represent a personal computer accessing a public switched telephone network through the Internet. Such access may occur at the LEC 110 or at the originating toll switch 120.

Originating toll switch 120 may comprise a #4 Electronic Switch System available from Lucent Technologies, Inc. or other toll switch known in the art. Originating toll switch 120 is shown linked to terminating toll switch 130. In a typical toll network, a plurality of toll switches may be linked by toll trunks or other links that may comprise facilities of optical fiber, land-based microwaves, satellites or other facilities known in the art.

NCP 170 is shown coupled to toll switch 120. The NCP 170 typically comprises a programmed computer and memory 172 which run standard database management system software to retrieve records and formulate call handling instructions for calls placed based on a set of stored parameters. Stored parameters may include telephone numbers, credit card numbers, calling card numbers, date of birth, Social Security numbers, etc.

In a typical call from calling party 101 across the telecommunication network, calling party 101 is connected to terminating toll switch 130 and from terminating toll switch 130 to another LEC 150. The link joining LEC 150 to called party 160 may likewise be bypassed, as may be the link between calling party 101 and LEC 110.

When calling party 101 calls called party 160, a calling party's address, for example, a routing number, the dialed telephone number of called party 160, along with other data are forwarded to originating toll switch 120 for processing. The routing number and other data form part of the ANI that precedes a telephone call and assists in routing, billing, and identifying the calling party 101. According to the teachings of the present invention, the term ANI it is not intended to represent only the calling party's address or telephone number of the calling party 101 or, alternatively, their credit card number. An ANI is intended to represent other data as well and may include, for example, additional caller identification information including name, address, Social Security number and the like. All of this information may be stored in the memory of NCP 170. Thus, when calling party 101 calls called party 160 using a credit card or a calling card, the account number (the credit card or calling card number) entered by the calling party 101 is part of the ANI data. This data is forwarded to NCP 170 via originating toll switch 120 wherein a look-up table in database 172 is used to identify an account number of calling party 101. Alternatively, NCP 170 may be linked to an external database such as database 180 where additional customer information is stored. One such external database may be a credit authorization bureau which stores personal information about credit card holders. Once the calling party's account has been activated, the account number entered by the caller can be replaced by a more recognizable number, such as the data stored in NCP 170, which better identifies the caller. The familiar "out of area" ID for calling card or credit card calls as displayed at Caller ID device 161 would be replaced by the data stored in NCP 170.

FIG. 2 is a flow chart for identifying the calling party 101 when the ANI associated with the calling party 101 is undisclosed or does not adequately identify calling party 101. In step 500, the ANI forwarded by calling party 101 is evaluated to determine if it adequately describes the calling party. If the calling party's address determined via ANI, which usually is the routing number or the billing number, adequately describes the caller, then the number is displayed as shown in step 501. If the ANI does not adequately describe the calling party 101, then the calling party 101 may be asked to supply additional information as shown in step 502. In situations where the calling party 101 does not supply additional information, the routing or billing number ANI is displayed to called party 160 as shown in step 503.

Alternatively, the additional information may be extracted from the calling party 101 or retrieved from a database as shown in block 504. The additional information may be stored in the memory 172 of NCP 170 or information may be stored in an external database 180. This additional information may include a caller's credit card number, home telephone number, business telephone number, name, etc. Next, a look-up table is used to verify the additional information from the credit card number of calling party 101. The present invention further incorporates features which communicate with a credit authorization bureau having access to additional information further identifying calling party 101.

The ANI forwarded by calling party 101 is then compared with the additional information stored in memory 172 or external database 180 in accordance with service provider/ subscriber parameters as shown in step 506.

If the additional information further identifies the calling party 101 as shown in step 507, then the additional information is displayed to called party 160 as shown is step 510. If the information does not further identify the calling party 101, then the forwarded ANI (the routing or billing number) is displayed as shown in step 508. Alternatively, the forwarded ANI and the additional data may be displayed as shown in step 509.

Although several preferred embodiments of this invention have been described in detailed herein with reference to the accompanying drawings, it is to be understood that the invention is not limited to these illustrative embodiments, and that various changes and modifications may be effected therein by one skilled in the art without departing from the true spirit and full scope of the invention as defined in the appended claims.

I claim:

1. A method for providing calling party identification data to a called party when a calling party is not at a location from which the automatic number identification (ANI) can be forwarded, the method comprising the steps of:

receiving partial identification data from a calling party, the partial identification data associated with at least one of the group comprising: a credit card number, a calling card number, a cellular telephone number, a public telephone number, an intelligent/agent number or a PBX number;

using the partial identification data, retrieving additional calling party identification data data stored in a database to further identify said calling party; and forwarding said additional calling party identification data to said called party.

2. The method according to claim 1 wherein the calling party uses a 900 number to reach the called party.

3. The method according to claim 1 wherein the calling party uses a 800 number to reach the called party.

4. The method according to claim 1 wherein the calling party is an out of area caller.

5. An apparatus for forwarding data identifying a calling party to a called party when the calling party is not at a location from which the automatic number identification (ANI) can be forwarded, the apparatus comprising

- a first switch for routing a call by a calling party wherein said first switch receives partial ANI data associated with said calling party, said partial ANI received data associated with at least one of the group comprising: a credit card number, a calling card number a cellular telephone number, a public telephone number, an intelligent/agent number or a PBX number;
- a programmable device having a memory for storing data further identifying said calling party wherein said programmable device communicates with said first switch;
- circuitry located in said programmable device for comparing partial ANI data received from said first switch with said stored data further identifying said calling party to verify that said stored data is associated with said calling party; and
- a second switch coupled to said first switch for forwarding data further identifying said calling party based on a result of said comparing circuitry if the comparison is verified.

6. The apparatus according to claim 5 wherein said programmable device is a network control point.

7. The apparatus according to claim 5 wherein said second switch for forwarding said data further identifying said calling party forwards at least one of the group comprising: a caller's name, a caller's home address or a caller's Social Security number.

8. A method of providing calling party identification information to a called party from a network, comprising the steps of:

- initiating a call from a voice-activated Agent, said voice-activated Agent being at a location from which the automatic number identification (ANI) cannot be forwarded;
- determining if partial data received from a switch identifies a calling party;
- retrieving from a network database and based on the calling party partial data, additional information identifying the calling party;
- forwarding said additional information identifying the calling party;
- comparing said partial data with said additional data information identifying the calling party to determine if said additional information identifying the calling party sufficiently identifies the calling party; and
- forwarding to said called party said additional information identifying the calling party if additional ANI data information sufficiently further identifies the calling party.

9. In a telecommunications network, a method for providing calling party identification information to a called party when the calling party is not at a location from which the automatic number identification (ANI) can be forwarded, the method comprising the steps of:

- receiving a query from a switch, the query including partial information associated with a calling party;
- in response to the query, retrieving additional information further identifying the calling party; and
- forwarding the additional information further identifying the calling party to the switch.

10. The method of claim 9, wherein the information further identifying the calling party comprises at least one of a name of the calling party and a telephone number of the calling party.

* * * * *